United States Patent [19]

Dillenburger et al.

[11] 3,755,621

[45] Aug. 28, 1973

[54] METHOD FOR DELAYING WIDE BAND ELECTRICAL SIGNALS

[75] Inventors: Wolfgang Dillenburger, Nieder-Ramstadt; Gerhard Krause, Ebersberg/Munich, both of Germany

[73] Assignee: Fernseh GmbH, Darmstadt, Germany

[22] Filed: Aug. 20, 1970

[21] Appl. No.: 65,446

[30] Foreign Application Priority Data

Aug. 20, 1969 Germany .................. P 19 42 290.3

[52] U.S. Cl. . 178/5.4 R, 178/6.6 DO, 178/DIG. 25, 333/30 R

[51] Int. Cl. ....... H04n 9/00, H04n 5/14, H03h 7/30

[58] Field of Search ................ 333/30 R; 178/5.4 C, 178/5.4 CD, 5.4 P, 5.4 S, DIG. 25, 6.6 DC

[56] References Cited

UNITED STATES PATENTS

| | | | |
|---|---|---|---|
| 3,020,482 | 2/1962 | Barton et al. | 333/30 R |
| 3,573,359 | 4/1971 | Guisinger | 178/6.6 DC |
| 2,929,870 | 3/1960 | Gibson et al. | 178/DIG. 25 |

*Primary Examiner*—Robert L. Griffin

*Assistant Examiner*—George Stellar

*Attorney*—Littlepage, Quaintance, Wray & Aisenberg

[57] ABSTRACT

A method for increasing the bandwidth of delay devices which operate to delay a modulated carrier wave. The frequency of the carrier is raised to an odd multiple of the fundamental frequency of the input and output transducers of the delay device, allowing operation over a wider bandwidth.

10 Claims, 2 Drawing Figures

Inventors:
Wolfgang Dillenburger
Gerhard Krause

METHOD FOR DELAYING WIDE BAND ELECTRICAL SIGNALS

BACKGROUND OF THE INVENTION

1. Field of the Invention

The invention relates to a method for delaying wide-band electrical signals, in particular television signals, by means of a device for delaying signals in a frequency band of predetermined bandwidth and center frequency, such as, in particular, an ultrasonic delay line.

2. Description of the Prior Art

Delay arrangements for electrical signals are already known which depend upon the transit time of an ultrasonic wave in a conductor of suitable material; for example, a special glass. For this purpose, the electrical input signal is converted by means of a piezo-electric transducer into an ultrasonic oscillation, which energizes the delay line. At the end of the delay line the ultrasonic oscillation is reconverted by means of a similar transducer into an electrical alternating voltage. In this method the electrical input signal is converted by a modulator into a carrier frequency signal, where the carrier frequency corresponds substantially to the natural frequency of the transducer. The delayed signal is restored to the original frequency by demodulation. The resonance of the transducer determines the bandwidth of the carrier-frequency signal which can be transmitted by the delay arrangement.

Such delay arrangements are used to a great extent in conventional color television systems to convert the components of the chrominance signal transmitted in succeeding line periods into a simultaneous signal. The transmission channel of this delay arrangement is usually determined by the frequency of the color carrier, for example 4.43 MHz, and the bandwidth corresponds to the bandwidth of the chrominance signal or of its components, of for example a maximum of ± 1 MHz. Because they are used in color television receivers in the PAL-SECAM systems, such delay arrangements lend themselves to large scale manufacture at a relatively favorable price.

SUMMARY OF THE INVENTION

The present invention takes as its basic purpose the use of such delay arrangements, having a predetermined bandwidth and center frequency, in higher bandwidths, for example for the delay of television signals over the full bandwidth of, for example 5 MHz.

A further problem which is solved by the present invention is the dual application of such a delay line for delaying two signals of differing bandwidths. The method according to the invention find a preferred application in devices for the compensation of signal deficiencies in magnetic-tape systems as well as in arrangements for vertical aperture correction of television signals.

The method according to the invention for delaying wideband signals, in particular television signals, by means of a delay device for a frequency band of predetermined bandwidth and center frequency, in particular an ultrasonic delay line, is characterised by the feature that the carrier-frequency signal which is modulated by the signal to be delayed, and which is delivered to the delay device, has a carrier frequency which is substantially an odd multiple of the fundamental oscillation frequency of the transducer.

The invention rests upon the knowledge that the known delay devices can be driven not only at the natural or resonant frequency but also at an harmonic of this natural or resonant frequency. The bandwidth increases in substantially direct proportion to the carrier frequency so that the delay device can be used for signals of greater bandwidth.

According to a further development of the invention it is possible to transmit over the delay arrangement, not only the carrier frequency signal whose carrier frequency amounts to substantially an integral multiple of the natural frequency of the delay arrangement, but also to transmit at the same time a second carrier frequency signal having a carrier of the natural frequency or some other multiple of the natural frequency. In this manner it is possible to assign a dual function to the delay arrangement and to use it simultaneously for delaying two signals, of which one has a greater bandwidth and the other has a smaller bandwidth.

BRIEF DESCRIPTION OF THE DRAWINGS

The invention will now be explained more precisely with the aid of arrangements illustrating practical examples thereof for performing the method. In the drawings.

DESCRIPTION OF THE PREFERRED EMBODIMENTS

Figure 1:
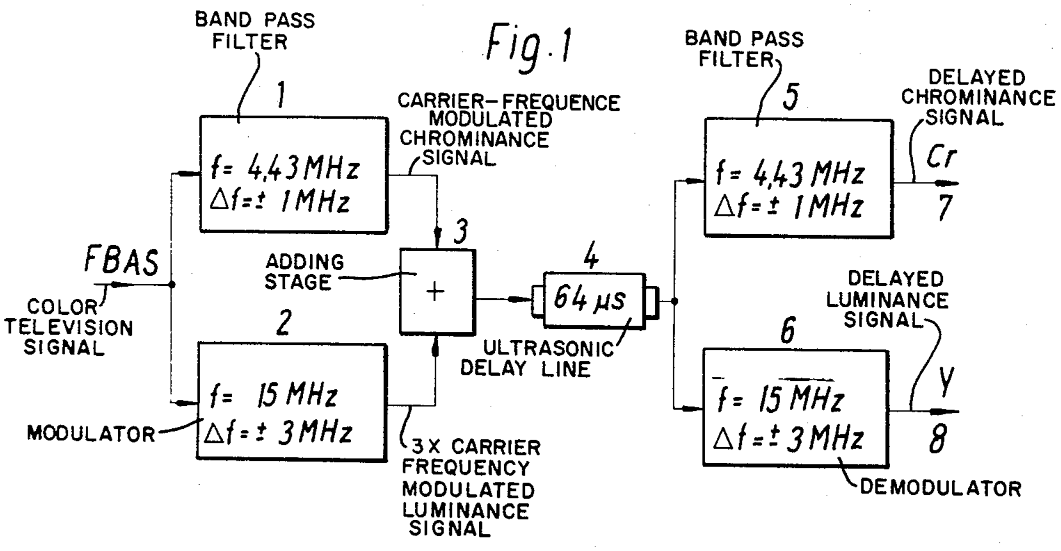
FIG. 1 is a block circuit diagram of a signal-delay arrangement for a compensator used for compensating signal deficiencies of a television signal taken from a magnetic tape.

In a known type of compensator, when interruptions occur in the signal, caused, for example, by defects in the magnetic tape, an error detector is used to switch-in, in place of the deficient signal component, the corresponding signal component of the preceding line period. The signal of the preceding line period must for this purpose be available continuously for the line duration at the output of a delay device. FIG. 1 shows a delay circuit suitable for this purpose for treating color television signals by the method according to the invention. For this purpose the color television signal FBAS is taken, which consists, as is known, of a luminance signal and a carrier-frequency-modulated chrominance signal having a carrier frequency of, for example, 4.43 MHz and a bandwidth of about ±1 MHz, and from it the chrominance signal is separated by means of a band-pass filter 1. By means of a modulator 2, a carrier-frequency luminance signal is derived, of which the carrier frequency amounts, for example, to about three times the value of the color carrier frequency of 4.43 MHz. That is to say, it has a frequency of 15 MHz. The two carrier-frequency signals are combined in an adding stage 3 and are delivered to an ultrasonic delay line 4 having a natural frequency of 4.43 MHz and a bandwidth of about ±1 MHz, which delay line has a delay period of the line duration, for example 64 microseconds. The chrominance signal is transmitted over the delay line 4 at its natural frequency of 4.43 MHz and with a small bandwidth of about ±1 MHz. At the same time the delay line is energized by the carrier-frequency luminance signal at the third harmonic of the natural frequency and transmits this signal with three times the bandwidth, that is to say about ±3 MHz.

At the output of the delay arrangement 4, the two carrier-frequency signals are again separated. A bandpass filter 5, with the center frequency of the color carrier of 4.43 MHz, delivers at its output terminal 7, the chrominance signal Cr delayed by one line period. A demodulator 6 is tuned to the frequency of the carrier-frequency luminance signal, in the present example to about 15 MHz, and delivers at its output terminal 8 the video-frequency luminance signal Y delayed by one line period.

Figure 2:
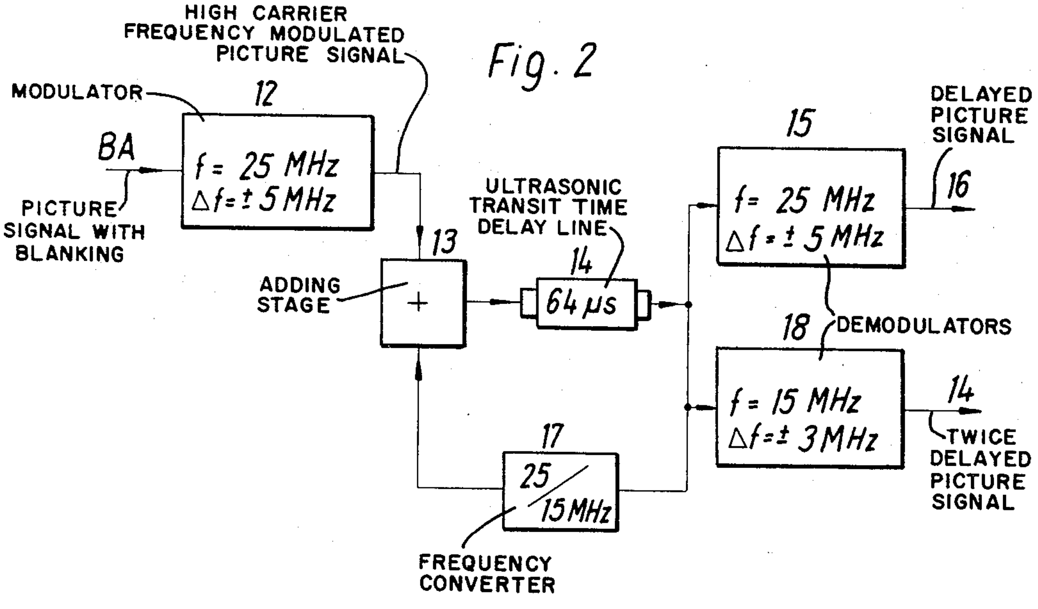
FIG. 2 shows the block circuit diagram of a delay arrangement for a vertical-aperture corrector.

FIG. 2 shows the application of the method according to the invention in a known arrangement for the vertical aperture correction of a color-television signal. In this known aperture correction, the television signal in each line period is compared with the signal of the preceding and the succeeding line periods, and from the signal differences, correction signals are derived, which are added to the original signal to improve the resolution in the vertical direction of the television picture. For the performance of this vertical aperture correction it is necessary to delay the television signal by a single line and by double the line duration, which is effected by the use of two series connected delay devices of one line duration. In this case the signal which has been delayed by one line duration represents the main signal, which is added to the correction signals derived from the undelayed signal and the signal which has been delayed by a further line period. The first delay device should therefore transmit the television signal with full bandwidth, because it is situated in the path of the main signal. For the second delay device it is sufficient to have a smaller bandwidth.

By the adoption of the method according to the invention, it is possible, by the use of a single transit-time line of simple construction and moderate cost, to perform the delay of a single-line duration with full bandwidth and to perform the subsequent delay of a further line duration with a reduced bandwidth. In order that the signal having the full bandwidth, for example 5 MHz, can be processed by the transit-time chain, the first delay is effected with a carrier-frequency signal, whose carrier frequency corresponds substantially to five times the value of the natural frequency of the transit-time line. In the case where the natural frequency of the transit-time line 14 is equal to the color carrier frequency of, for example, 4.43 MHz, this carrier frequency amounts, for example, to 25 MHz. The color television signal BA (picture signal with blanking) is for this purpose converted in a modulator 12 into a carrier-frequency amplitude-modulated signal, whose bandwidth, at a maximum modulation frequency of 5 MHz, extends from 17 to 27 MHz. This carrier frequency signal passes through an adding stage 13, whose function will be described later on, to reach the delay line 14, and energizes the latter at the fifth harmonic of its natural frequency of about 4.43 MHz, with which a frequency band can be transmitted of 5 MHz ( 17 . . . 27 MHz). The signal delayed by one line period is demodulated in a demodulator 15 so that at the output 16 of the demodulator the video-frequency television signal can be taken off with a full bandwidth of 5 MHz and with a delay by one line period.

The delayed carrier frequency signal now passes from the output of the transit-time line 14 to a frequency converter 17, which delivers a carrier-frequency signal at a smaller multiple of the natural frequency of the transit-time line, for example at the third harmonic of about 15 MHz. This signal which has been delayed by one line period and which has been converted in a frequency converter to a lower carrier frequency of about 15 MHz, is now added, in the adding stage 13, to the undelayed carrier frequency signals having the higher carrier frequency of about 25 MHz, and arrives simultaneously with the latter, but already delayed by one line period, at the input of the delay device 14. In the latter it is again delayed by a further line period, while the band width corresponding to the lower carrier frequency now amounts to about 6 MHz, corresponding to a modulating frequency of 3 MHz. This carrier frequency signal which has been delayed by the double line duration is demodulated in a further demodulator 18, at whose output 19 there is available the signal of limited bandwidth delayed by the double line duration.

What is claimed is:

1. In a method for delaying wideband signals in a delay device including input and output transducers having a predetermined bandwidth and center frequency by carrying out the steps of:

A. modulating a carrier frequency signal with an information signal,

B. applying the resulting modulated signal to the input transducer of said delay device, and C. taking the delayed modulated signal from the output transducer of said delay device and deriving therefrom a delayed information signal, the transducers having a fundamental frequency of oscillation, the improvement comprising:

D. using for said carrier frequency signal a first frequency which is substantially one integral multiple harmonic of the fundamental frequency of oscillation of the transducers, and E. simultaneously transmitting over said delay line a second carrier-frequency signal at a different second carrier frequency also corresponding to another integral multiple harmonic of the fundamental frequency of oscillation of the transducers different from said one integral multiple harmonic, whereby the bandwidth for usable information signals is substantially proportionally higher when using higher carrier frequencies than when using lower carrier frequencies.

2. A method according to claim 1 adapted for use in an arrangement for compensating signal deficiencies in drop-out compensator magnetic-tape systems comprising the step of transmitting a luminance signal portion of a color television signal at a higher carrier frequency than is used for a chrominance signal portion.

3. A method according to claim 1 adapted for use with a vertical-aperture corrector comprising the further step of transmitting a color television signal of full bandwidth at a relatively high carrier frequency, and transmitting a signal of reduced bandwidth at a relatively low carrier frequency.

4. A method according to claim 1 comprising the further steps of converting a carrier-frequency signal occupying a relatively higher frequency position, after passing once through the delay device, to a lower carrier frequency by means of a frequency changer, and delivering the signal thus converted in frequency to the delay line for further delay at a smaller bandwidth.

5. The method of claim 1 wherein said second carrier frequency is an integral multiple of the fundamental frequency, the second carrier frequency being lower in frequency than the first carrier frequency signal, and separating the resulting delayed signals according to frequency for separate use at the output of the delay device.

6. The method of claim 1 further comprising converting the delayed modulated signal at the first carrier frequency to a converted signal at the second carrier frequency, passing the converted signal to said input transducer of the delayed device, and demodulating the converted and delayed signal, thereby producing a twice delayed signal.

7. The method of claim 6 further comprising separately demodulating the delayed modulated signal and the twice delayed converted signal.

8. Apparatus for delaying first information signals comprising a delay element having a fundamental frequency, a modulator connected to the input of the delay element for producing a first carrier frequency at one integral multiple harmonic of the fundamental frequency of the delay element for application to the delay element, a source of first information signals connected to the modulator for modulating the carrier frequency, and a demodulator connected to the output of the delay element for receiving a delayed modulated carrier, demodulating the first carrier and producing a delayed first information signal, and further comprising means for providing a second information signal for modulating a second carrier at a second carrier frequency corresponding to another integral multiple harmonic of the fundamental frequency of the delay element different from said one integral multiple harmonic, means for simultaneously applying the second carrier to the input of the delay element, and means at the output of the delay element for separating the first and second carrier frequency signals.

9. The apparatus of claim 8 wherein the second information signal has a narrow band with respect to the first information signal, and wherein the means for applying further comprises a band pass filter for conducting the narrow band signal and its carrier to the delay, and the means for separating comprises a second band pass filter connected to an output of the delay for transmitting the narrow band signal from the delay.

10. The apparatus of claim 8 further comprising a converter connected to an output of the delay for converting the modulated first carrier to a modulated signal at the second carrier frequency which is an integral multiple harmonic of the fundamental frequency, the converter having connection means to an input of the delay for transmitting the signal with the second carrier frequency to the delay, and a second demodulator connected to an output of the delay for demodulating the signal having the second carrier frequency, whereby a twice delayed signal is available at an output of the second modulator.

* * * * *